United States Patent [19]
Bajc

[11] Patent Number: 6,083,312
[45] Date of Patent: *Jul. 4, 2000

[54] LOW VOC COATINGS

[75] Inventor: Gerald L. Bajc, Hackettstown, N.J.

[73] Assignee: BASF Corporation, Southfield, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 08/827,141

[22] Filed: Mar. 27, 1997

[51] Int. Cl.$^7$ .................................................. C09D 191/00
[52] U.S. Cl. ............................................ 106/243; 106/264
[58] Field of Search ...................... 106/243, 264

[56] References Cited

U.S. PATENT DOCUMENTS

| | | | |
|---|---|---|---|
| 4,072,642 | 2/1978 | Ritz et al. | 260/22 CB |
| 4,983,716 | 1/1991 | Rao et al. | 528/272 |
| 5,504,151 | 4/1996 | Fisher et al. | 525/49 |

OTHER PUBLICATIONS

CA 94:210406, Turner, "Surface coating compositions containing . . . ", Oct. 29, 1980.
CA 91:142153, Pepelysheva et al, "Modification of vegetable oils and alkyd . . . ", 1978.
CA 84:32162, Kanai et al, "Electrically insulating materials", Jun. 17, 1975.
CA 104:170195, Turner, "Surface coating compositions", Jul. 17, 1985.
CA 123:59130, Endo et al, "Alkyd dispersion printing inks", Oct. 21, 1994.
CA 114:230785, Hashizume et al, "Room temperature–curable high–solids coatings", Dec. 5, 1990.
CA 113:154307, Love, "Aluminum organic compounds . . . ", 1989.
CA 97:94056, Kansai Paint Co., "Water–thinned alkyd resin coating materials", Apr. 13, 1982.
CA 99:124174, Hitachi Chemical Co., "Water–dispersed resin compostion", Mar. 28, 1983.
CA 99:214251, Hitachi Chemical Co., "Water–dispersed alkyd resin coatings", Mar. 28, 1983.
CA 119:51433, Hiryana et al, "Resin composition for water–thinned coatings", Feb. 19, 1993.

*Primary Examiner*—David Brunsman

[57] ABSTRACT

Low VOC coating compositions are disclosed. In particular, high solids low volatile organic (VOC) solvent-borne automotive paint composition are disclosed. In addition, low VOC alkyd compositions are disclosed for use alone or that may also be used with conventional high VOC tinting bases. The compositions include a resin consisting of the esterification reaction product of dehydrated castor oil fatty acid, tris-hydroxyethyl isocyanate and hydrated monobutyl tin oxide and an ethyl acetoacetonate chelation reaction product with aluminum alkoxide.

4 Claims, No Drawings

LOW VOC COATINGS

FIELD OF THE INVENTION

The present invention relates to automotive paint compositions, and more particularly to high solids low volatile organic content (VOC) solvent-borne automotive paint compositions. More particularly the present invention relates to low VOC alkyd compositions which can utilize conventional high VOC tinting bases.

Automotive solvent-borne paint compositions according to the present invention having high solids and low VOC content comprise basecoat formulations, clearcoat formulations and single stage topcoat formulations.

BACKGROUND OF THE INVENTION

Environmental concerns have generated government regulations setting forth guidelines and regulations relating to a lowering of VOC in paint compositions. An approach based on polyesters or alkyds (polyester) have been used in the past. Polyesters can either be used as the primary vehicle or as additives which lower coating application viscosity and subsequently crosslink into the film.

Conventional polyesters previously examined for use as low volatile organic content vehicles, while high in solid content, have produced coatings that remain tacky for long periods of time when used at conventional application spray viscosity.

SUMMARY OF THE INVENTION

This invention consists of a coating composition using the following two additives used, separately or in combination, in a conventional high solids paint system to reduce the VOC:

1. The ethyl acetoacetate chelation reaction product of an aluminum alkoxide such as aluminum di-ispropoxide or aluminum sec-butoxide.

2. The esterification product of tris-hydroxyethyl isocyanurate with a fatty acid such as dehydrated caster oil fatty acid or a combination of other fatty acids. Non fatty monoacid substituants are also contemplated such that the hardness of the coating is modified.

Although this invention's primary utility is in converting conventional solids systems to low VOC, it is further contemplated that this system (1 or 2) has utility in the formation of a low VOC formulation by itself.

DETAILED DESCRIPTION OF THE INVENTION

This invention consists of a coating composition using the following two additives, used separately or in combination, in a conventional high solids paint system to reduce the VOC:

1. The ethyl acetoacetate chelation reaction product of an aluminum alkoxide such as aluminum di-ispropoxide or aluminum sec-butoxide.

2. The esterification product of tris-hydroxyethyl isocyanurate with a fatty acid such as dehydrated castor oil fatty acid or a combination of other fatty acids. Non fatty monoacid substituants are also contemplated such that the hardness of the coating is modified.

A preferred embodiment of the invention comprises component (1) in combination with (2) the esterification reaction product of dehydrated castor oil fatty acid, tris-hydroxethyl isocyanate and hydrated monobutyl tin oxide.

Although this invention's primary utility is in converting conventional high solids systems to low VOC, is further contemplated that this system has utility in a low VOC formulation by itself.

The present invention is also directed to automotive paint compositions having a high solids content and low VOC properties. These coatings have been found to exhibit excellent physical properties with short tack-free and dust-free time and suitable pot or shelf life.

While any substrate material can be coated with the coating compositions according to the present invention, including such things as glass, ceramics, paper, wood, and even plastic material depending on the specific drying and/or curing requirements of the particular composition, the coating system of the present invention is particularly adapted for metal substrates, and specifically as an automotive paint re-finish system. The substrate may also be bare substrate material or can be conventionally primed, for example to impart corrosion resistance. Exemplary material substrates include such things as steel, aluminum, copper, zinc, magnesium, and alloys thereof The components of the compositions can be varied to suit the temperature tolerance of the substrate material. For example, the components can be so constituted for air drying (i.e., ambient, low temperature cure (e.g., 100° F. (38° C.)–180° F. (82° C.)), or high temperature cure (e.g., over 180° F. (82° C.)).

The coating compositions of the present invention can be used as either pigmented topcoats of as the basecoat of pigmented basecoat/clearcoat topcoat multicoat coating compositions. It is preferred to use the coatings of the present invention as a pigmented topcoat. Although the pigmented topcoat coating is preferred, it will be appreciated that the coatings described herein can have utility as pigmented basecoat and as clearcoat.

When a clearcoat is used containing the low VOC resin of the present invention it may be coated over any basecoat known to the art. When a basecoat containing the low VOC resin is clearcoated with a low VOC or conventional resin, superior paint compositions are obtained.

The basecoat material, i.e., the pigmented polymer layer closest to the substrate, comprises any suitable film-forming material conventionally used in this art including acrylics, alkyd, polyurethanes, polyesters and aminoplast. The basecoat can be deposited out of an aqueous carrier, or out of conventional volatile organic solvents such as aliphatic, cycloaliphatic and aromatic hydrocarbons, esters, ethers, ketones and alcohols including such things as toluene, xylene, butyl acetate, acetone, methyl isobutyl ketone, and butyl alcohol. When using volatile organic solvents, although it is not required, it is preferred to include a conventional rheology control agent such as 2% to 50% by weight of a cellulose ester and/or wax (e.g., polyethylene) which facilitates quick release of the volatile organic solvent resulting in improved flow or leveling out of the coating. The cellulose esters used must be compatible with the particular resin systems selected and include such things as cellulose nitrate, cellulose propionate, cellulose butyrate, cellulose acetate butyrate, cellulose acetate propionate and mixtures thereof The cellulose esters when used are preferably used in 5% to 20% by weight based on film forming solids.

Other types of rheology control agents conventional in this art include microparticles or microgels. These microgels or microparticles comprise polymer particles in a dispersed state, typically, 2 wt. % to 20 wt. % of solid vehicle of a microparticle dispersion is added to the basecoat formulation.

Microparticle or microgel dispersions, also known as nonaqueous dispersions can be utilized and are useful as rheology control agents in the basecoats of the present invention are disclosed in U.S. Pat. Nos. 3,365,414; 4,290,932; 4,377,661; 4,414,357; 4,447,536 which are incorporated by reference.

The acrylic resins in the basecoat may be either thermoplastic (acrylic lacquer systems) or thermosetting. Acrylic lacquers such as are described in U.S. Pat. No. 2,860,110 are one type of film forming composition useful according to this invention in the basecoat. The acrylic lacquer compositions typically include homopolymers of methyl methacrylate and copolymers of methyl methacrylates which contain among others, acrylic acid, methacrylic acid, alkyl esters of acrylic acid, alkyl esters of methacrylic acid, vinyl acetate, acrylonitrille, and styrene.

The following examples are given to illustrate utilities of the low VOC coatings, according to the present invention.

EXAMPLE #1

Part A:

A reactor fitted with agitator, addition ports, packed column (with thermocouple probe at its top), reflux condenser, thermocouple probe, and inert gas inlet was charged with commercially available 65.3 g. Tris-2-hydoxyethyl isocyanurate (THEIC), 210 g. of dehydrated castor oil fatty acid, and hydrated monobutyl tin oxide (after THEIC melted). The reactor was fitted with a Barrett trap filled with toluene, below the condenser. The reactor was purged with nitrogen, with a trace flow of nitrogen remaining after purging, while heating to 198° C., 30° g. of toluene was added to control reflux. After about 4 hours, batch was cooled under nitrogen and acid number determined at 22. After 6 more hours, using toluene to adjust reflux, acid number was 0.3 and the reaction cooled.

EXAMPLE #2

An alkyd clear-coat was prepared as follows:

| Part A | |
|---|---|
| BASF Select LA1204 | 293.4 |
| BASF 305 drier package | 32.6 |
| BASF Enamel reducer 59 | 81.40 |
| Part B | |
| Part A | 307.4 |
| Dehydrated Castor Oil (Alnor) | 98.4 |
| Part C | |
| Aluminum diisopropoxide | 125 |
| ethyl acetoacetonate chelate | 30 |

Part C clearcoat was applied by a 48 wire wound drawdown bar over cold rolled steel panel. The coating was allowed to cure at ambient room temperature and was tack-free[1] 6 hours later. Viscosity of material was 25.6 using a Zahn 2 viscosity cup. Control material made of Part B was tack-free in 4 hours with a viscosity of 21.5".

[1] Tack-free Test: Whitehouse test number WTF005: test panels were tested with a foil coated device with a 1 square inch surface area designed to exert an average 49 mNewton force (5 g.×9.8 m/s2). The test was run by placing a 1 pound weight on the 1 square inch surface for 5 seconds. The weight is removed to observe whether the tester falls.

Overnight the film made from Part C was little softer compared to the film made from Part B.

An alkyd top-coat was prepared as follows (MC denoted bases were supplied by BASF Canada affiliate):

| | |
|---|---|
| BASF QWB900 (MC900) like LST344 | 121.9 g. |
| BASF QKB402 (MC402) like LST322 | 2.4 |
| BASFQYB704 (MC704) like LST332 | 0.3 |
| BASF QRB805 (MC805) like LST340 | 0.08 |
| BASF ER59 | 29.4 |
| Polymer of Example 1 | 70.7 |
| Trimethylolpropane trimethacrylate | 7.9 |
| BASF SR350 drier package | 23.3 |
| 90% Chatham AIEM in V&MP Naptha | |
| Aluminum diisopropoxide ethyl acetoacetonate chelate | 30.6 |
| Total | 286.6 |

A coating prepared with this material was free from lint and cotton fibers (after placing a cotton ball on panel) after 3 hours. VOC of coating was 3.39 lb. per gallon. Viscosity was 22" using a Zahn 2 viscosity cup. Panel appearance was excellent compared to control material.

What it claimed is:

1. A high solids, solvent borne, ambient cure automotive coating composition comprising:

(a) a resin consisting of the esterification reaction product of dehydrated castor oil fatty acid, tris-hydroxyethyl isocyanate and hydrated monobutyl tin oxide, (b) an ethyl acetoacetonate chelation reaction product with aluminum alkoxide.

2. The composition of claim 1 wherein the aluminum alkoxide is aluminum di-isopropoxide.

3. The composition of claim 1 wherein the aluminum alkoxide is aluminum sec-butoxide.

4. A high solids, solvent borne, ambient cure coating composition comprising:

(a) a resin consisting of the esterification reaction product of dehydrated castor oil fatty acid, tris-hydroxyethyl isocyanate and hydrated monobutyl tin oxide and (b) an ethyl acetoacetonate chelation reaction product with aluminum alkoxide, resulting in a coating composition having a VOC of 3.39 lbs. per gallon.

* * * * *